(12) United States Patent
Quintus et al.

(10) Patent No.: US 8,123,640 B2
(45) Date of Patent: Feb. 28, 2012

(54) BELT TENSIONER WITH DAMPING MEMBER

(75) Inventors: James G. Quintus, Springfield, MO (US); Robert C. Joslyn, Nixa, MO (US)

(73) Assignee: Dayco Products, LLC, Tulsa, OK (US)

( * ) Notice: Subject to any disclaimer, the term of this patent is extended or adjusted under 35 U.S.C. 154(b) by 43 days.

(21) Appl. No.: 12/858,548

(22) Filed: Aug. 18, 2010

(65) Prior Publication Data

US 2010/0323833 A1 Dec. 23, 2010

Related U.S. Application Data

(62) Division of application No. 11/171,137, filed on Jun. 28, 2005.

(51) Int. Cl.
*F16H 7/12* (2006.01)

(52) U.S. Cl. ....................................... 474/135

(58) Field of Classification Search ............ 474/133, 474/135
See application file for complete search history.

(56) References Cited

U.S. PATENT DOCUMENTS

| | | |
|---|---|---|
| 4,689,037 A | 8/1987 | Bytzek |
| 4,822,322 A | 4/1989 | Martin |
| 4,826,471 A | 5/1989 | Ushio |
| 5,131,889 A | 7/1992 | Meckstroth et al. |
| 5,370,585 A | 12/1994 | Thomey et al. |
| 5,470,280 A | 11/1995 | Ayukawa |
| 5,632,697 A | 5/1997 | Serkh |
| 5,647,813 A | 7/1997 | Serkh |
| 6,206,797 B1 | 3/2001 | Quintus |
| 6,231,465 B1 | 5/2001 | Quintus |
| 6,264,578 B1 | 7/2001 | Ayukawa |
| 6,497,632 B2 | 12/2002 | Ayukawa et al. |
| 6,565,468 B2 | 5/2003 | Serkh |
| 6,582,332 B2 | 6/2003 | Serkh |
| 6,609,988 B1 | 8/2003 | Liu et al. |
| 6,863,631 B2 | 3/2005 | Meckstroth et al. |
| 7,104,909 B2 | 9/2006 | Asbeck et al. |
| 7,887,445 B2 | 2/2011 | Quintus et al. |
| 2002/0010045 A1 | 1/2002 | Serkh |
| 2003/0008739 A1 | 1/2003 | Asbeck et al. |

FOREIGN PATENT DOCUMENTS

JP 7-259935 10/1995

(Continued)

OTHER PUBLICATIONS

PCT, International Search Report, International Application No. PCT/US2005/026343 (mailed Mar. 15, 2006; published Jan. 4, 2007).

(Continued)

*Primary Examiner* — Robert Siconolfi
*Assistant Examiner* — James Hsiao
(74) *Attorney, Agent, or Firm* — Thompson Hine LLP

(57) ABSTRACT

A tensioner for tensioning a belt includes a support housing at least in part defining a spring cavity. A damping member having a first friction bearing surface is at least partially disposed in the spring cavity. An arm pivotally attached to the support housing has a second friction bearing surface. A spring is located in the spring cavity and operatively connected to the arm and damping member to pivot the damping member about a pivot location such that the first friction bearing surface of the damping member is biased against the second friction bearing surface of the arm to dampen relative movement between the arm and the support housing.

21 Claims, 9 Drawing Sheets

FOREIGN PATENT DOCUMENTS

| | | |
|---|---|---|
| JP | 2000-018346 | 1/2000 |
| JP | 2002-349650 | 12/2002 |
| JP | 2003-254399 | 9/2003 |
| JP | 2003-287096 | 10/2003 |
| JP | 2003-530527 | 10/2003 |
| WO | 01/51828 | 7/2001 |
| WO | 2004/033933 | 4/2004 |

OTHER PUBLICATIONS

PCT, International Preliminary Report on Patentability, International Application No. PCT/US2005/026343 (May 14, 2007).

EP, Supplementary European Search Report, European Application No. 05775218.0 (Jul. 14, 2008).

EP, Examination Report, European Application No. 05775218.0 (Jun. 16, 2010).

CN, Notification of First Office Action, Chinese Application No. 20058005903.X (Jun. 26, 2009).

CN, Notification of Second Office Action, Chinese Application No. 20058005903.X (Feb. 5, 2010).

US, Office Action, U.S. Appl. No. 11/171,137 (Oct. 3, 2008).

US, Office Action, U.S. Appl. No. 11/171,137 (Mar. 4, 2009).

US, Office Action, U.S. Appl. No. 11/171,137 (Nov. 24, 2009).

US, Office Action, U.S. Appl. No. 11/171,137 (Mar. 2, 2010).

JP, Notice of Reason for Rejection, Japanese Application No. 2008-519252 (Dec. 14, 2010).

EP, European Search Report, European Application No. 10012111.0 (Feb. 7, 2011).

CN, Notification of First Office Action, Chinese Application No. 201010267806.9 (Jul. 4, 2011).

EP, Decision to Grant a European Patent, European Application No. 05775218.0 (Aug. 11, 2011).

BELT TENSIONER WITH DAMPING MEMBER

This is a divisional application of application Ser. No. 11/171,137 filed Jun. 28, 2005.

TECHNICAL FIELD

The present application relates generally to belt tensioners and more particularly to a belt tensioner including a damping member.

BACKGROUND

It is known to drive various automobile accessory assemblies, for example the water pump, the generator, the fan for cooling the coolant, the power steering pump, and the compressor, by the vehicle engine. This is done by a driving pulley actuated by the engine shaft of the motor vehicle which drives an endless drive belt operating the accessory assemblies through driven pulleys.

In many of these automotive accessory drives, it is desirable to control belt tension. To this end, numerous structures of belt tensioners have been proposed which provide such tension control. These include asymmetric tensioners where the friction force and dissipated vibration energy is significantly higher during a tensioner loading cycle than those during a tensioner unloading cycle.

SUMMARY

In an aspect, a tensioner for tensioning a belt includes a support housing at least in part defining a spring cavity. A damping member having a first friction bearing surface is at least partially disposed in the spring cavity. An arm pivotally attached to the support housing has a second friction bearing surface. A spring is located in the spring cavity and operatively connected to the arm and damping member to pivot the damping member about a pivot location such that the first friction bearing surface of the damping member is biased against the second friction bearing surface of the arm to dampen relative movement between the arm and the support housing.

In another aspect, a tensioner for tensioning a belt includes a support housing at least in part defining a spring cavity. A damping member is engaged with the support housing, the damping member at least partially disposed in the spring cavity. An arm is pivotally attached to the support housing. A spring is located in the spring cavity and operatively connected to the arm and damping member to bias the damping member against a friction bearing surface located in the spring cavity for damping relative movement between the arm and the support housing. The damping member and spring are connected at a single location.

In another aspect, a tensioner for tensioning a belt includes a support housing at least in part defining a spring cavity. A damping member has a first friction surface and includes pivot structure for use in forming a pivot location located outside the spring cavity. An arm is pivotally attached to the support housing. A spring is located in the spring cavity and operatively connected to the arm and damping member to pivot the damping member about the pivot location such that the first friction surface of the damping member is biased against a second friction surface to dampen relative movement between the arm and the support housing.

In another aspect, a method of tensioning a belt using a tensioner including a support housing at least in part defining a spring cavity and an arm pivotally connected to the support housing is provided. The method includes biasing the arm relative to the support housing a spring. A damping member is biased against a friction bearing surface defined by the arm using the spring by pivoting the damping member about a pivot location.

In another aspect, a tensioner for tensioning a belt includes a support housing including first pivot structure. The support housing at least in part defines a spring cavity. A damping member has a first contact surface and includes second pivot structure for engaging the first pivot structure to form a pivot location. The damping member is at least partially disposed in the spring cavity. An arm is pivotally attached to the support housing. A spring is located in the spring cavity and is operatively connected to the arm and the damping member to pivot the damping member about the pivot location such that the first contact surface of the damping member is biased against a second contact surface in the spring cavity to dampen relative movement between the arm and support housing.

DETAILED DESCRIPTION

Figure 1:
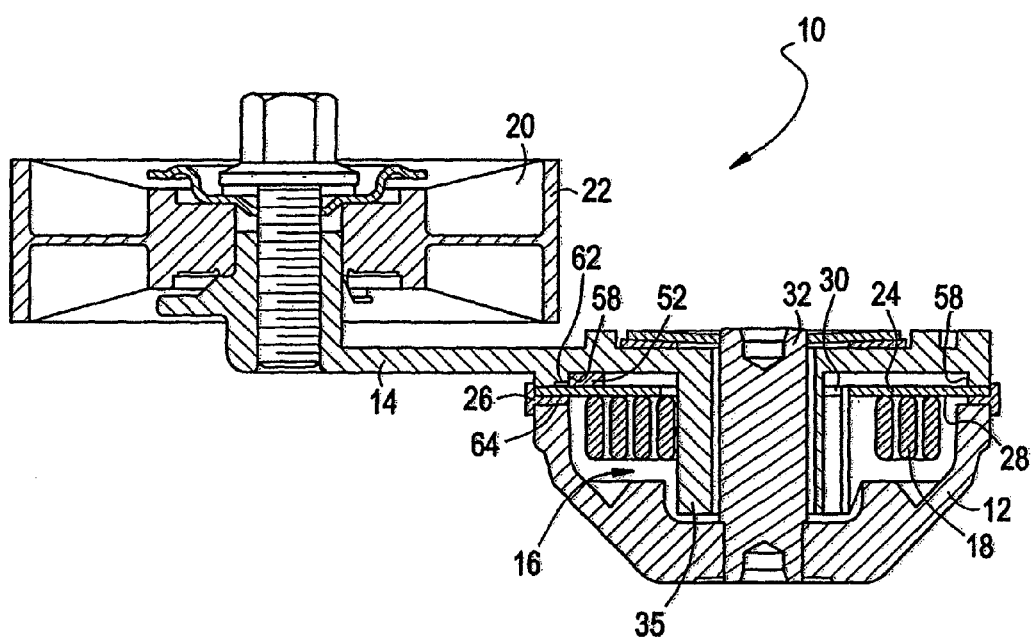
FIG. 1 is a cross-section view of an embodiment of a belt tensioner including an embodiment of a damping member.

Referring to FIG. 1, a belt tensioner 10 includes a support housing 12 and a pivot arm 14 rotatably mounted to the support housing to form a spring cavity 16 therebetween. A damping member 24 is at least partially disposed in the spring cavity 16 to provide damping of relative movement between the support housing 12 and the pivot arm 14. Also located within the spring cavity 16 and operatively connected to both the pivot arm 14 and the damping member 24 is a flat wire spring 18. Spring 18 applies a force to the damping member 24 during use and is also used to bias the pivot arm 14 toward an unloaded position. Pivot arm 14 carries a pulley 20, such as a front or backside idler pulley, that can rotate relative to the pivot arm. The pulley 20 has a belt-engaging surface 22 for engaging a belt, such as an automotive transmission belt. A bushing 26 is located between the damping member 24 and support housing 12 to reduce wear and provide a seal that can inhibit contaminants from entering the spring cavity 16. Additional details of certain tensioner features can be found in U.S. Pat. No. 6,206,797, the content of which is hereby incorporated by reference as if fully set forth herein.

Figure 2:
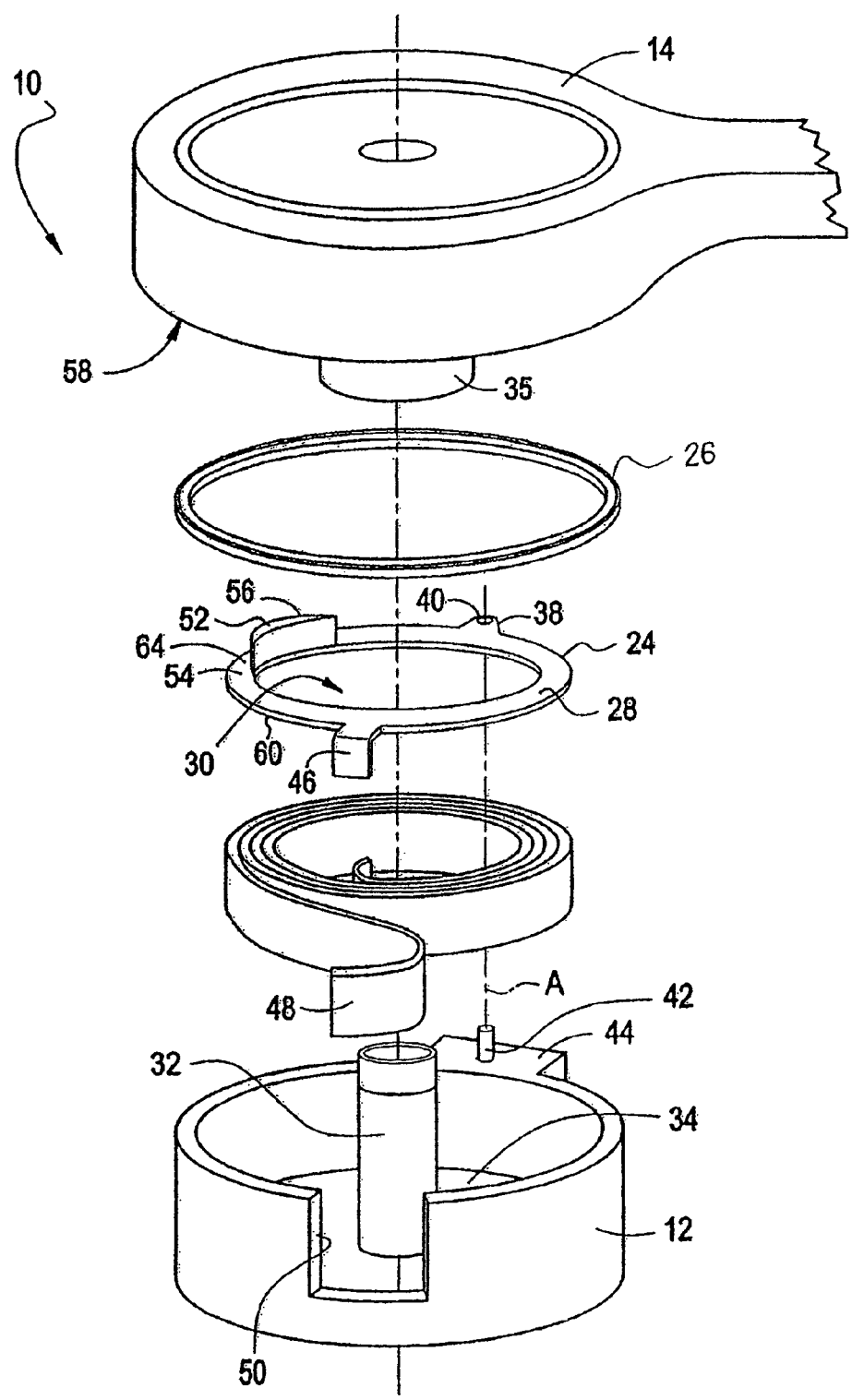
FIG. 2 is an exploded, perspective view of the belt tensioner of FIG. 1.

Referring also to FIG. 2, damping member 24 includes a plate 28 (e.g., formed of metal such as steel) having an opening 30 extending therethrough. Opening 30 can receive an arbor 35 extending downwardly from pivot arm 14 and an alignment member 32 extending upwardly from a base 34 of the support housing 12 and received by the arbor 35. Opening 30 is dimensioned to receive the arbor 35 and alignment member 32 with enough freedom to allow for movement of the damping member 24 relative to the support housing 12 as will be described below. As can be seen by FIG. 2, extending outwardly from a periphery 60 of the plate 28 is an extension 38 having pivot structure 40 in this instance formed as a hole extending through the extension. Other pivot structures are possible, such as a hook-shaped pivot structure (not shown). The pivot structure 40 can mate with cooperating pivot structure 42 carried by the support housing 12 (in this embodiment, a projection extending outwardly from a ledge 44 of the support housing) to form an axis of rotation A for the damping member 24 that is fixed relative to the support housing. Engagement structure 46 is oppositely located (e.g., a central angle of about 180 degrees) from the pivot structure 40. Engagement structure 46 engages an outer hook-shaped end 48 of the spring 18 within or near a keyway 50 formed in the support housing 12. Keyway 50 allows spring end 48 to extend outwardly from the support housing 12 and facilitates some movement of the damping member 24 and spring end 48 during tensioning.

A friction member 52 extends outward from an upper, substantially planar surface 54 of the plate 28. Friction member 52 is centrally located about the periphery of the plate 28 between the pivot structure 40 and the engagement structure 46. In some embodiments the friction member 52 may be located a central angle from the engaging structure between about 180 degrees and 360 degrees, such as between about 200 degrees and 300 degrees. Friction member 52 can be formed of a high friction material such as those used to form brake pads, such as high density polyethylene and nylon 6/3. Other materials may be used to form the friction member 52. Friction member 52 has a friction bearing surface 56 that is located to contact an inner surface 58 of pivot arm 14 (see FIG. 1) and is offset from an outer periphery 60 of the plate 28. In an alternative embodiment, at least a portion of friction member 52 is located at or near the outer periphery 60 of plate 28. Friction bearing surface 56 is arcuate having a contour to maximize contact area with the inner surface 58 during use. Referring briefly back to FIG. 1, an outer portion 64 of the plate 28 is received between the bushing 26 and the arm 14 such that there is contact between the friction bearing surface 56 and the inner surface 58. By placing the plate 28 therebetween, added stability (e.g., resistance against forces applied out of the plane of the plate 28) can be achieved. In some embodiments, outer portion 64 may not be received between the arm 14 and the bushing 26. In some instances, the support housing 12 and/or arm 14 may include a recess 62 that receives an outer portion 64 of the plate 28 during use to allow for contact between the friction bearing surface 56 and the inner surface 58.

Damping member 24 can be formed of any suitable materials. Suitable materials for forming the plate 28 include metals, such as steel. Suitable materials for forming the friction member 52 include plastics such as high density polyethylene and nylon (e.g., nylon 6/3), organic materials, rubber (e.g., EDPM rubber), paper, etc. Fillers may also be used, such as glass fibers or beads, metal fibers, phenolic fillers, etc. Friction member 52 can be attached to the plate 28 using adhesives (e.g., phenolic adhesive) or any other suitable method. Plate 28 can be formed by any suitable process such as by stamping, cutting, etching, bending, etc. In some cases, friction member 52 may be formed by overmolding or attaching plastic material (such as a plastic sheet) onto a metal projection extending from the plate 28.

Figure 3:
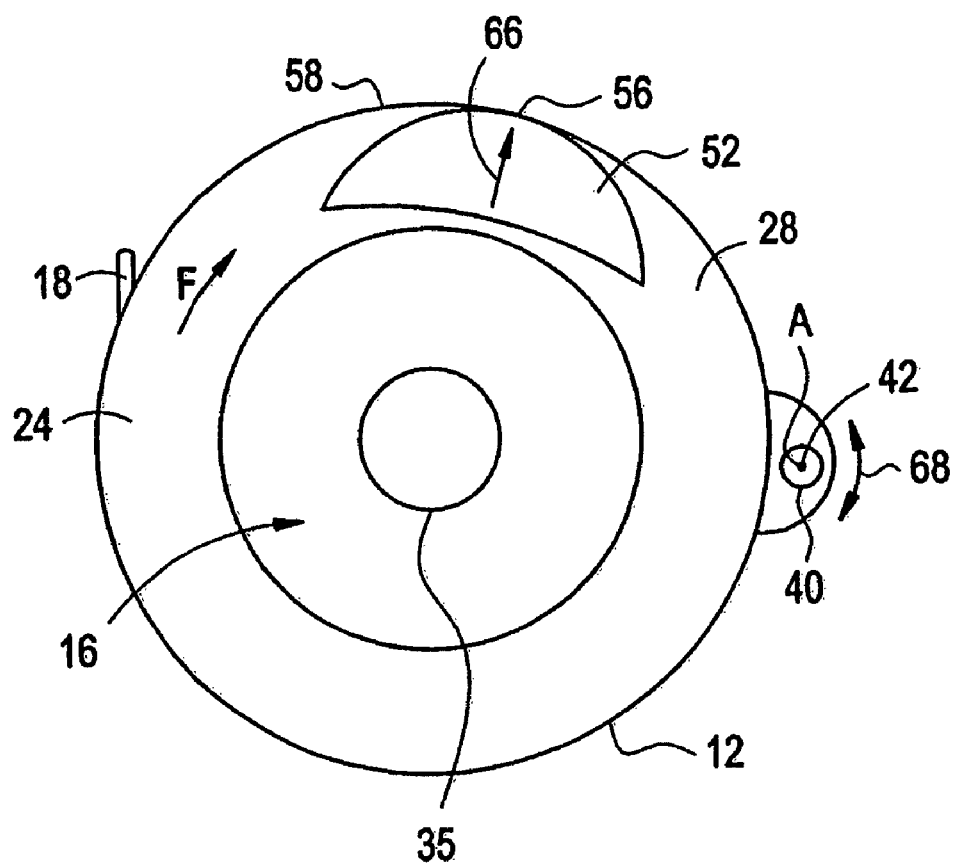
FIG. 3 is a diagrammatic view of operation of the damping member.

FIG. 3 is a diagrammatic view of damping member 24 in use. As can be seen, plate 28 is connected to the support housing 12 using pivot structures 40 and 42, which provide axis A that is fixed relative to the support housing and located outside the spring cavity 16. Damping member 24 can pivot about A (in the direction of arrow 68) due to a force F applied by spring 18 and freedom provided between the plate 28 and arbor 35 of the arm 14. Plate 28 is connected to spring 18 as described above at the side opposite the pivot structures 40, 42. In some embodiments, the spring 18 is preloaded such that the friction member 52 is biased against inner surface 58 (see also FIG. 2) of the pivot arm 14 in the direction of arrow 66 even with the pivot arm 14 in the unloaded position. This preloading of the spring 18 can provide for continuous contact between the friction bearing surface 56 and inner surface 58 throughout the pivot arm's entire range of rotation. Damping member 24 can provide damping during both loading and unloading of the pivot arm 14 due to the continuous contact between the friction member 52 and the pivot arm. As the pivot arm 14 is rotated relative to the support housing 12 away from its unloaded position (e.g., due to contact with an automotive belt), the spring 18 is loaded further, increasing the damping between the friction member 52 and the inner surface 58 of the pivot arm. As the pivot arm 14 is allowed to return toward its unloaded position, the spring 18 unloads, decreasing the damping between the friction member 52 and the inner surface 18 of the pivot arm.

It should be noted that damping member 24 can be used as a source of added tensioner damping. For example, other tensioner features may provide tensioner damping, such as those described in U.S. Pat. No. 6,206,797, already incorporated by reference. In some embodiments, it may be desirable to retrofit existing tensioners with a damping member 24 to provide added damping. Because the damping member 24 can provide more damping with the tensioner arm 14 traveling one way than with the tensioner arm traveling the opposite way, the damping member provides a tensioner having asymmetric damping.

Figure 4:
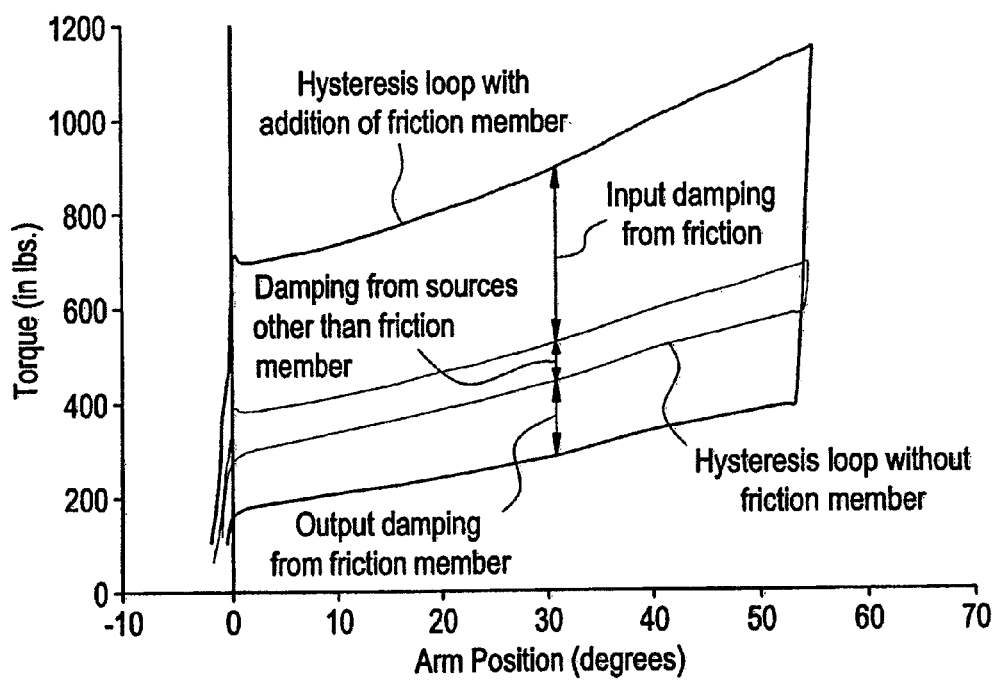
FIG. 4 is a hysteresis curve for a tensioner including damping member.

It can be appreciated that the normal force exerted on the inner surface 58 by the friction member 52 is a function of the actuation force supplied by the spring 18 and the direction of arm 14 rotation, thus resulting in asymmetric damping. The distance of the friction member 52 from the axis A can affect operation of the damping member 24. For example, with reference to FIG. 3, moving the friction member 52 from its illustrated position along the plate 28 and away from the axis A toward the engaging structure 56 may increase the self-energizing properties of the damping member 24 and increase the amount damping asymmetry realized by the tensioner 10. Thus, in some instances, the locations of components of the damping member 24, such as the friction member 52, pivot structure 40 and engagement structure 46, can be positioned based on a desired application FIG. 4 shows a hysteresis curve for tensioner 10. The hysteresis curve indicates the input damping due to the addition of the friction member 52/damping member 24 arrangement, damping from sources other than the friction member 52/damping member 24 arrangement and output damping due to the addition of the friction member 52/damping member 24 arrangement.

Figure 5:
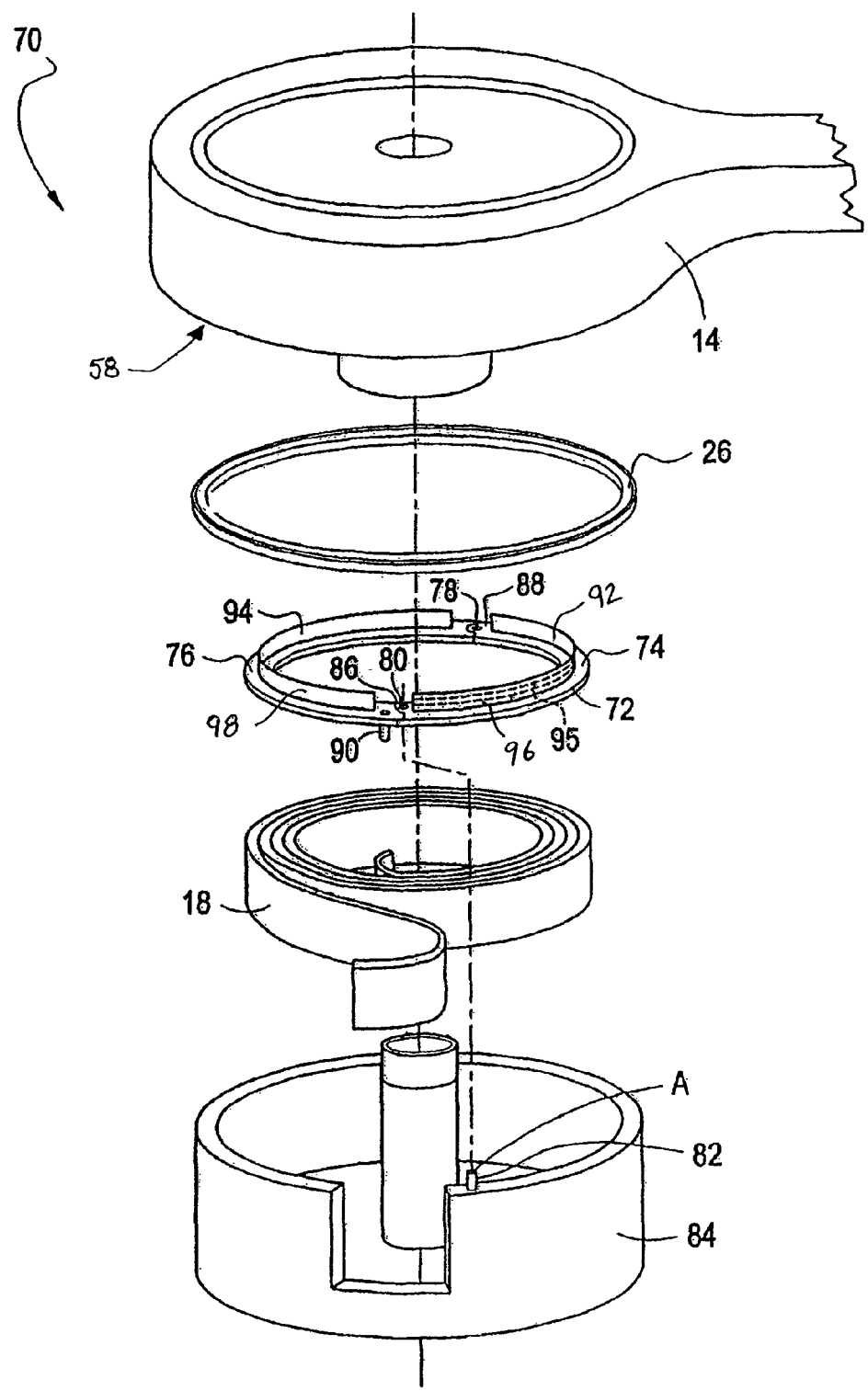
FIG. 5 is an exploded, perspective view of another embodiment of a belt tensioner.

Referring now to FIG. 5, a tensioner 70 including alternative damping member 72 includes a first damping portion 74 and a second damping portion 76 pivotally connected to the first damping portion at a joint 78. Joint 78 is a hinge-type connection, however, other connections can be used, such as a flexible joint, which can reduce part count and eliminate process associated with joining the portions 74, 76. The flexible joint can be a thinned cross section that reduces stiffness in the desired direction, while maintaining a stiffness in others. First damping portion 74 includes pivot structure 80 in this instance formed as an opening that cooperates with pivot structure 82 carried by a support housing 84 to form an axis of rotation A. Axis A is fixed relative to the support housing 84. Pivot structure 80 is located near an end 86 of the first damping portion 74 that is opposite an end 88 connected to the second damping portion 76. Second damping portion 76 includes connecting structure 90 that is used to connect the damping member 72 to the spring 18. Each of the first and second damping portions 74, 76 includes a respective friction member 92, 94. Friction members 92, 94 include friction bearing surfaces 96, 98 that contact inner surface 58 of the pivot arm 14 during use. In some embodiments, represented by dotted lines, the friction bearing surfaces 96, 98 may be formed by strips of material 95 (e.g., of plastic) attached to the friction members 92, 94, such as by an adhesive.

Figure 6:
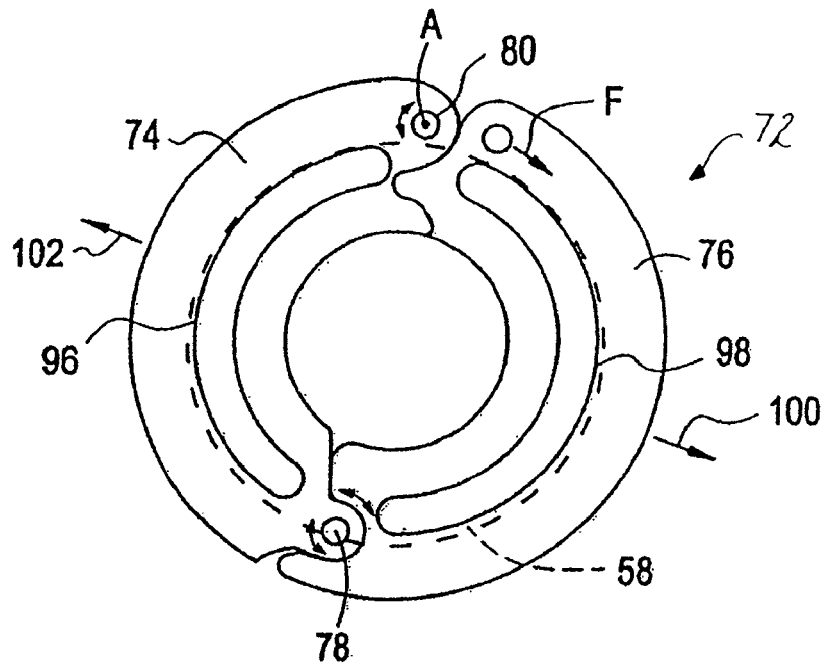
FIGS. 6 and 7 are top views of an embodiment of a dual portion damping member.
Figure 7:
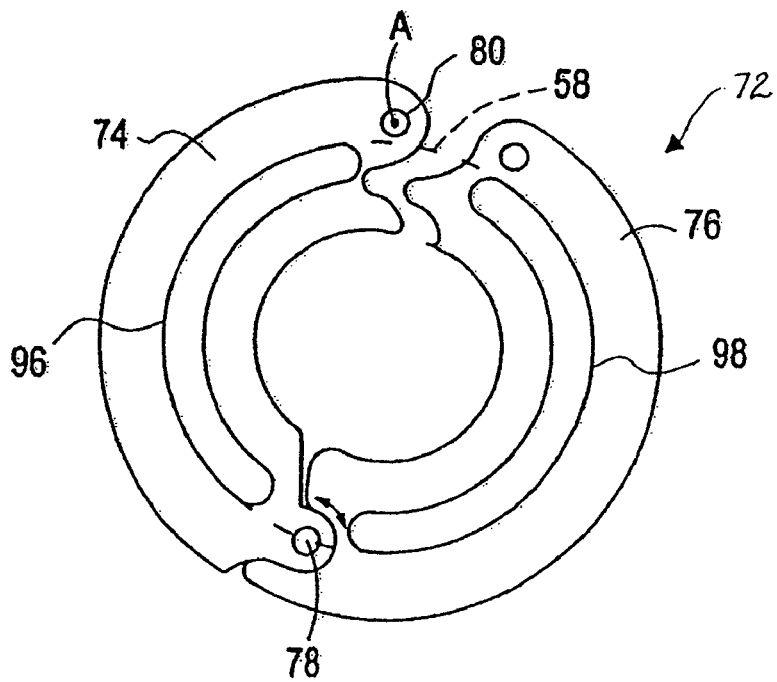

Referring now to FIGS. 6 and 7, during operation, first damping portion 74 can pivot relative to the support housing 84 about axis A formed by the cooperating pivot structures 80 and 82. When force F is applied to second damping portion 76 through the connection with the spring 18 (FIG. 5), the friction bearing surface 98 is urged outward in the direction of arrow 100 against inner surface 58 (represented by the dotted line), with the second damping portion pivoting at joint 78 relative to the first damping portion 74. Force is also transferred to the first damping member 74, which urges the first friction bearing surface 96 against inner surface 58 in the direction of arrow 102. As the first and second members 74, 76 are urged against inner surface 58 with greater biasing force applied by the spring 18 (e.g., due to force being applied to the pivot arm 14 by an automotive belt), the friction bearing surfaces 96, 98 apply greater pressure to the inner surface 58, increasing the damping force.

Damping member 72 having such dual damping portions 74 and 76 can provide a more symmetric application of damping force to the inner surface 58 during use. This can reduce potential for misalignment of the tensioner 70 during a tensioning operation. Damping member 72 may also have increased contact area with the inner surface 58 under a given load, for example, compared to some single friction member embodiments. This may provide increased damping of the tensioner arm under lighter spring loads.

Figure 8:
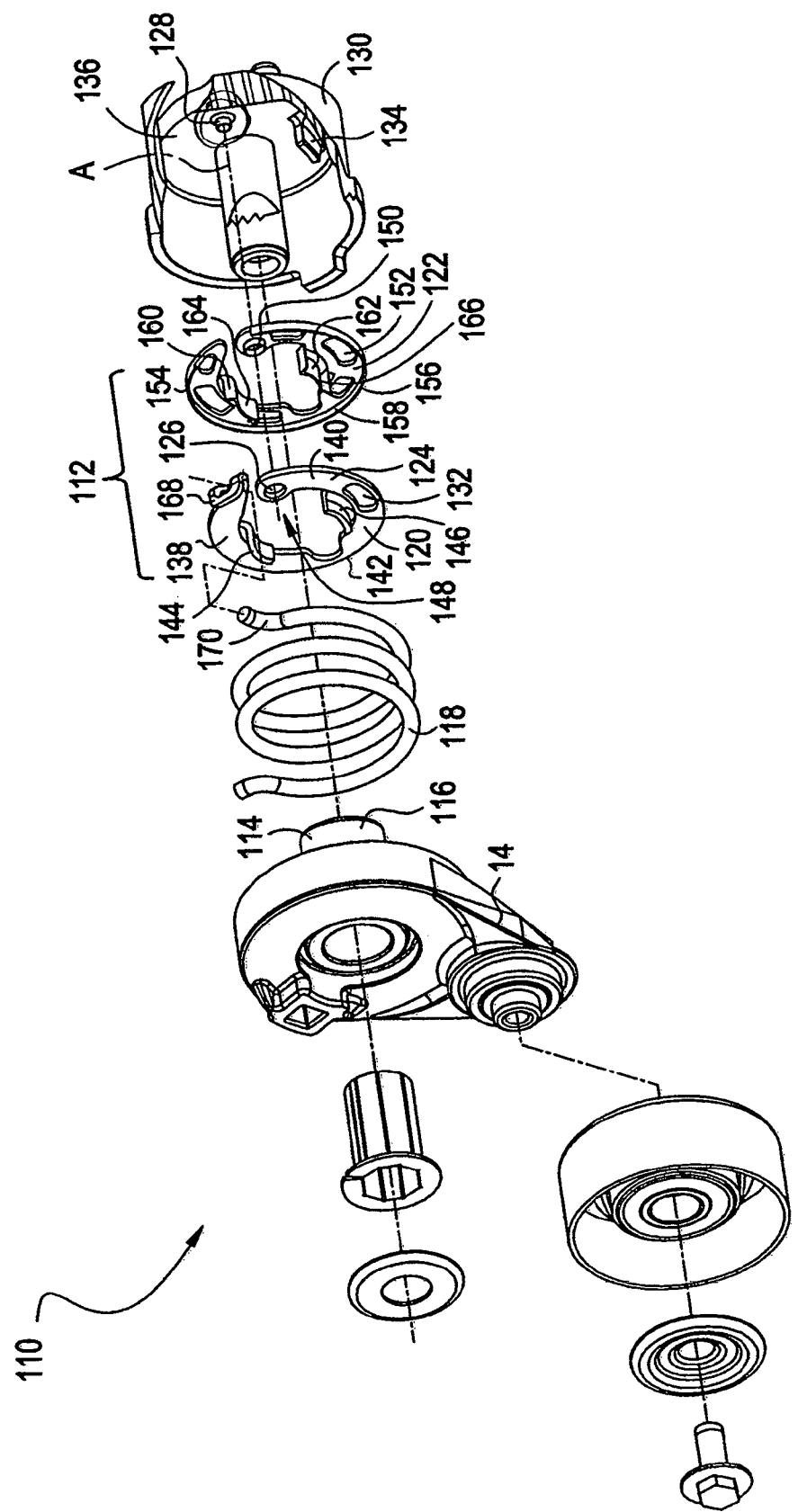
FIG. 8 is an exploded, perspective view of another embodiment of a tensioner including an embodiment of a multi-piece damping member.

Referring to FIG. 8, another tensioner embodiment 110 includes a damping member 112 that is biased against an outer surface 114 of an arm arbor 116 using a round wire spring 118. The round wire spring 118 is also used to bias the pivot arm 14 toward an unloaded position relative to a support housing 130. An example of a tensioner including a round wire spring can be found in pending U.S. patent application Ser. No. 11/040,283, filed Jan. 20, 2005, entitled "Belt Tensioner" the details of which are hereby incorporated by reference as if fully set forth herein. The damping member 112 is of a multi-piece construction that includes a first, load-bearing member 120 (e.g., formed of metal, such as steel) and a second, protective member 122 (e.g., formed of plastic).

Figure 10:
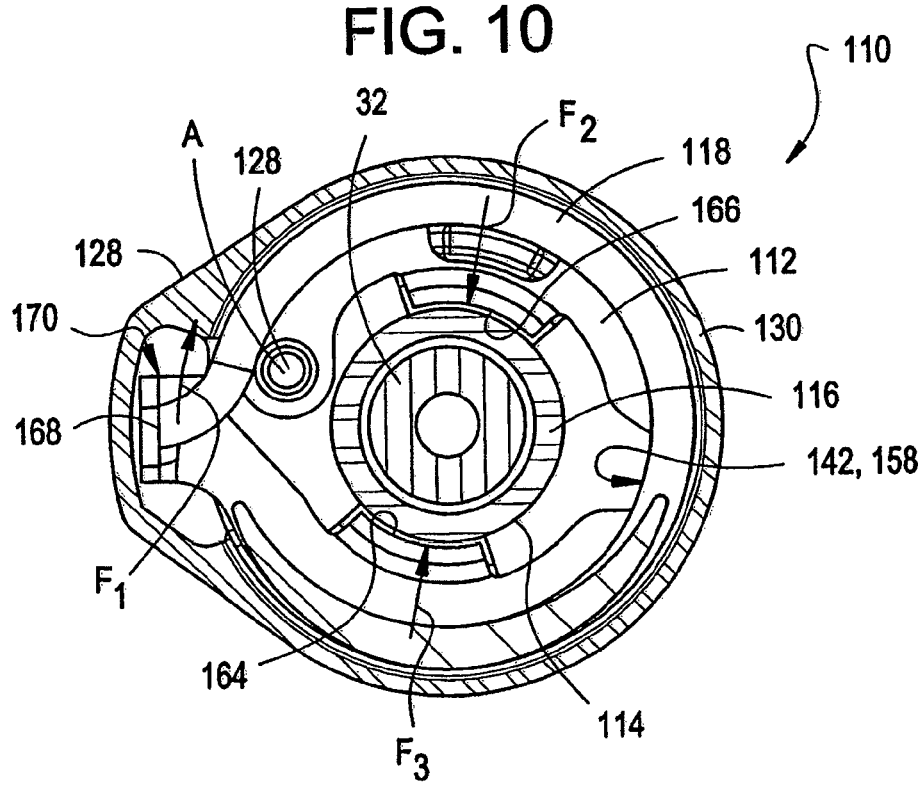
FIG. 10 is a cross-section view of the tensioner of FIG. 8 assembled with the damping member of FIG. 8.

First member 120 includes a plate 124, pivot structure 126 in this instance an opening that cooperates with pivot structure 128 (e.g., a projection) carried by the support housing 130 to form an axis A that is fixed relative to the support housing, and a slot 132 for receiving a spring contact member 134 extending from a base 136 of the support housing that contacts the spring 118 enabling the spring to apply a force to the damping member 112 using only a single contact location (FIG. 10). Plate 124 is divided into two portions 138 and 140 by a relatively flexible, joint region 142 (e.g., disposed about 180 degrees from the pivot structure 126) that joins the portions 138 and 140 and allows them to move inwardly toward each other in a clamping-like fashion. Each portion 138 and 140 includes an annular projection 144 and 146 located at an inner opening 148 extending through the plate 124. Located at an end of the first member 120 is engaging structure 168 for use in engaging a lower end 170 of round wire spring 118.

Second member 122 mates with the first member 120 and includes pivot structure 150 (e.g., an opening that aligns with opening 126 of the first member) and slot 152 that aligns with slot 132 for receiving spring contact member 134. Like first member 120, the second member 122 is divided into two portions 154 and 156 by a relatively flexible joint region 158 (e.g., disposed about 180 degrees from the pivot structure 150). Each portion 154 and 156 includes an annular projection 160 and 162 that mates with projections 144 and 146 of the first member 120 to form friction bearing surfaces 164 and 166 for contacting arm arbor 116.

Figure 9:
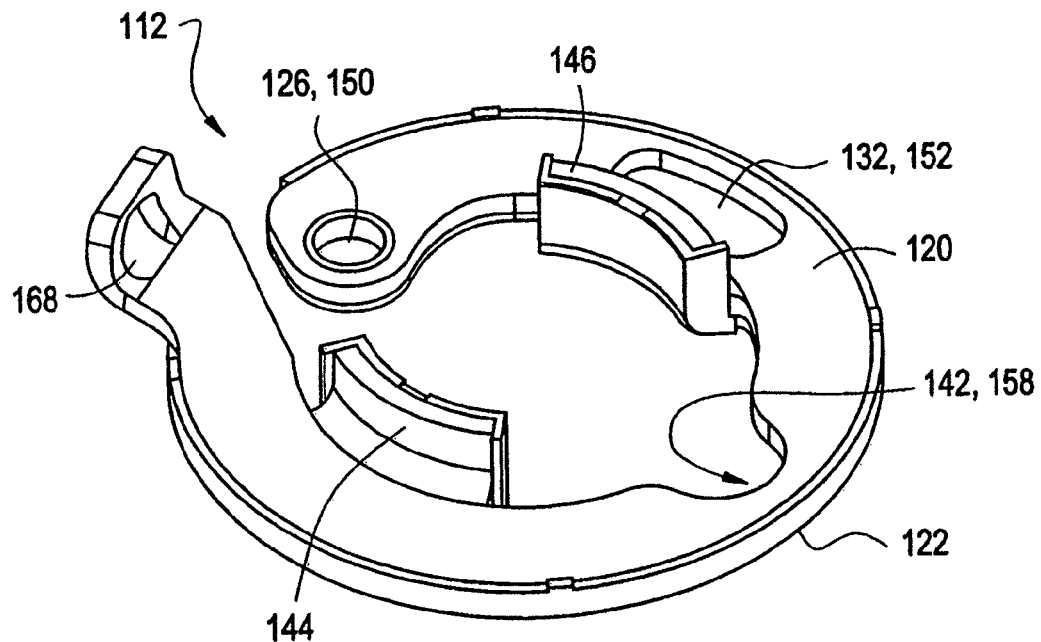
FIG. 9 is a perspective view of the multi-piece damping member of FIG. 8.

Referring to FIG. 9, the first and second members 120, 122 engage to form the damping member 112. In some embodiments, the second member 122 is overmolded on the load-bearing member 120. Alternatively, the second member 122 may be formed separately and then attached, such as by use of adhesive, to the first member. In some instances, damping member 112 may not include the second member 122 and plastic or other suitable material may be attached to the projections 144 and 146 for use in contacting arm arbor 116. In these cases, a bushing may be located between the damping member 112 and base 136 of the support housing 130.

Referring now to FIG. 10, as assembled, damping member 112 is pivotally engaged with pivot structure 128 of the support housing 130 and spring 118 is connected to the damping member 112 within the engaging structure 168 at a single contact location 170. In some embodiments, spring 118 is preloaded such that with the pivot arm 14 (see FIG. 9) in its unloaded position, friction bearing surfaces 164 and 166 clamp against the arm arbor 116 (disposed about alignment member 32 of the support housing) due to flexure of the damping member 112 at the flexible joint regions 142 and 158 (see FIG. 9). As can be seen by FIG. 10, the friction bearing surfaces 164 and 166 each can have a shape corresponding to the curvature of the arm arbor 116 to maximize the contact area therebetween. As the pivot arm 14 is loaded and moves from the unloaded position, a greater force $F_1$ is applied to the damping member 112, in turn, urging the friction bearing surfaces 164 and 166 against the arm arbor 116 with greater clamping forces $F_2$ and $F_3$, which are used to dampen movement between the pivot arm 14 and the support housing 130. The damping provided is proportional to the increase in spring torque as the arm 14 is rotated.

Damping member 112 can be formed of any suitable materials. Suitable materials for forming the first member 120 include metals, such as steel. Suitable materials for forming the second member 122 include plastics such as high density polyethylene and nylon (e.g., nylon 6/3), organic materials, rubber (e.g., EDPM rubber), paper, etc. Fillers may also be used, such as glass fibers or beads, metal fibers, phenolic fillers, etc. First member 120 can be formed by any suitable process such as by stamping, cutting, etching, bending, etc. Second member 122 may be formed by molding, such by injection molding, vacuum molding, etc.

Damping member 112, by applying opposing damping forces to opposite sides to the arm arbor, can provide a more symmetric application of damping force to the arm arbor 116 during use. This can reduce potential for misalignment of the tensioner 110 during a tensioning operation. Damping member 112 may also have increased contact area with the arm arbor 116 under a given load, for example, compared to some single friction member embodiments. This may provide increased damping of the tensioner arm under lighter spring loads. The spring 118 applies the force to the damping member 112 that is used to rotate the damping member about the fixed pivot axis A.

Figure 11:
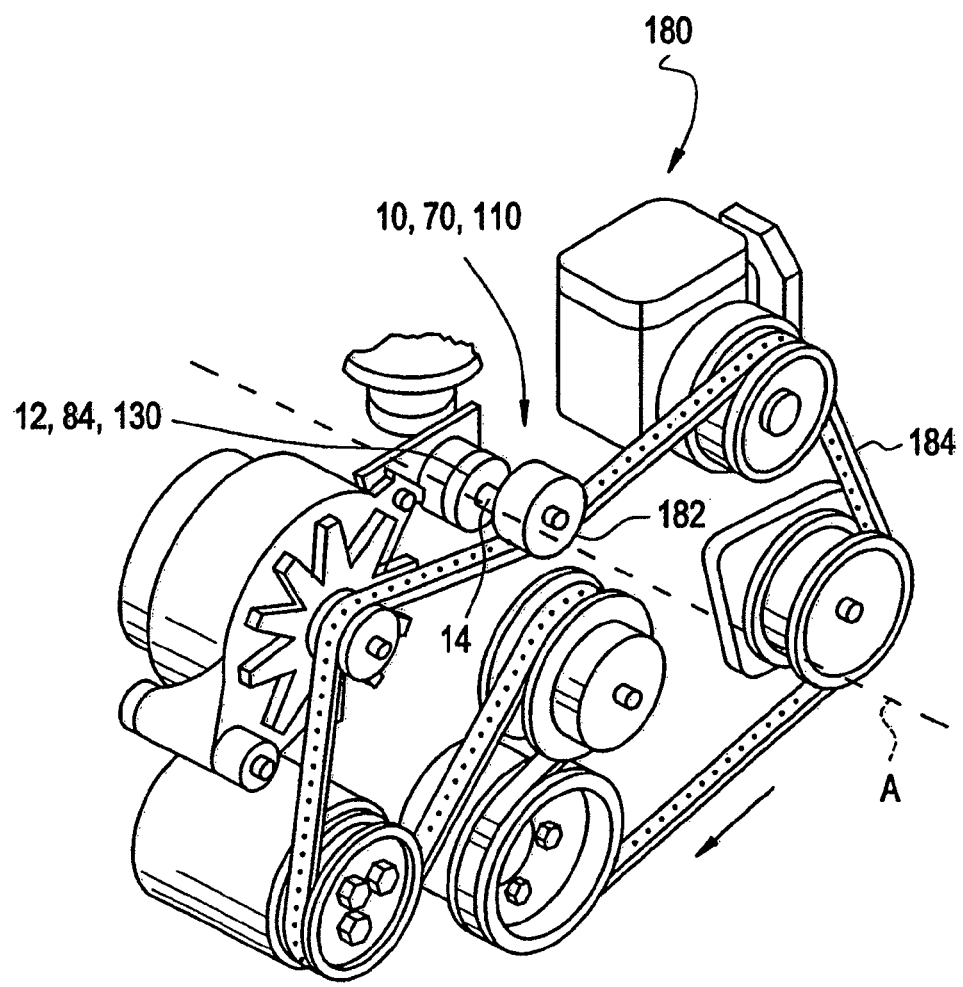
FIG. 11 is a perspective view of a motor including a tensioner with a damping member.

Referring to FIG. 11, a tensioner (such as tensioner 10, 70, 110) is shown mounted to an automobile engine 180 with pulley 182 engaged with transmission belt 184. Support housing 12, 84, 130 is fixedly mounted to the engine and, as described above, the pivot arm 14 is rotatable relative to the support housing. Because the pivot axis A of the damping member (not shown in FIG. 11) is fixed relative to the support housing 12, 84, 130, axis A is also fixed relative to the engine 180. Thus, the pivot axis A does not move relative to the engine 180 during movement of the pivot arm 14.

As noted above, the above-described tensioners 10, 70, 110 can provide asymmetric damping of movement of the pivot arm 14 relative to the support housing 12, 84, 130. In some embodiments, damping is greater with the pivot arm 14 traveling in the loading direction (i.e., away from belt 184) than in the unloading direction (i.e., toward the belt 184). This can provide desirable belt control characteristics, which can increase life of the belt 184.

A number of detailed embodiments have been described. Nevertheless, it will be understood that various modifications may be made. For example, it may be possible to use different spring and damping member combinations other than those described above such as the use of a damping member 112 that is configured for use with a flat wire spring. Accordingly, other embodiments are within the scope of the following claims.

What is claimed:

1. A method of tensioning a belt comprising:
   providing a tensioner comprising:
     a support housing comprising a cavity with a pivot shaft therein that defines a first axis of rotation and comprising a first pivot structure defining a second axis of rotation;
     an arm rotatable about the pivot shaft;
     a spring located in the cavity of the support housing, the spring comprising a first end and a second end, the first end being coupled to the arm to bias the arm about the first axis of rotation defined by the pivot shaft;
     a damping member comprising a plate having an inner opening extending therethrough to receive the pivot shaft of the support housing, having an engagement structure engaged with the second end of the spring, and having a second pivot structure pivotally engaged with the first pivot structure of the support housing;
     wherein the spring biases the damping member to pivot about the second axis of rotation to provide the asymmetric damping;
   biasing the arm relative to the support housing using the spring; and
   biasing the damping member against a friction bearing surface defined by the arm using the same spring by pivoting the damping member about the second axis of rotation.

2. The method of claim 1 the engagement structure of the damping member connects to the spring at a single location.

3. The method of claim 1, wherein the step of biasing the damping member against the friction bearing surface includes biasing the damping member against an arm arbor extending from the arm into the cavity of the support housing.

4. A tensioner for asymmetric tensioning of an article, the tensioner comprising:
   a support housing comprising a cavity with a pivot shaft therein that defines a first axis of rotation and comprising a first pivot structure defining a second axis of rotation;
   an arm rotatable about the pivot shaft;
   a spring located in the cavity of the support housing, the spring comprising a first end and a second end, the first end being coupled to the arm to bias the arm about the first axis of rotation defined by the pivot shaft;
   a damping member comprising a plate having an inner opening extending therethrough to receive the pivot shaft of the support housing, having an engagement structure engaged with the second end of the spring, and having a second pivot structure pivotally engaged with the first pivot structure of the support housing;
   wherein the spring biases the damping member to pivot about the second axis of rotation to provide the asymmetric damping.

5. The tensioner of claim 4, wherein the spring is a round wire spring.

6. The tensioner of claim 4, wherein the spring is a flat wire spring.

7. The tensioner of claim 4 wherein the first pivot structure is located outside the cavity of the support housing.

8. The tensioner of claim 4 wherein the engagement structure is positioned generally opposite the second pivot structure.

9. The tensioner of claim 4 wherein the plate further comprises an opening in the exterior periphery thereof that extends into the inner opening thereby providing the plate with a general C-shape.

10. The tensioner of claim 9 wherein the plate further comprises a flexible joint located generally opposite the second pivot structure, wherein the flexible joint enables the C-shaped plate to move inwardly in a direction toward the pivot shaft in a clamping-like fashion.

11. The tensioner of claim 10 wherein the plate comprises at least one annular projection located at the inner opening in the plate and extending therethrough.

12. The tensioner of claim 11 wherein the first pivot structure is located inside the cavity of the support housing.

13. The tensioner of claim 10 wherein the engagement structure is located generally opposite the flexible joint.

14. The tensioner of claim 4 wherein the spring is preloaded such that the damping member is biased against the arm for continuous contact therewith.

15. The tensioner of claim 14 wherein the damping member further comprises a friction member extending therefrom that is in continuous contact with the arm.

16. The tensioner of claim 15 wherein as the spring is loaded further the friction member is biased into the arm for increased frictional damping.

17. The tensioner of claim 15 wherein the friction member is generally located about the periphery of the damping member.

18. The tensioner of claim 15 wherein the friction member extends outward from an upper generally planar surface of the plate.

19. The tensioner of claim 15 wherein the damping member is biased against an inner surface of the arm.

20. The tensioner of claim 15 wherein the arm further comprises an arm arbor and the damping member is biased against an outer surface of the arm arbor.

21. The tensioner of claim 9 further comprising a spring contact member extending outwardly from the cavity of the support housing; the damping member further comprising a slot extending therethrough that is sized to receive the spring contact member; and wherein the spring contact member provides a single contact location for the spring to apply a force to the damping member.

* * * * *